United States Patent
Stuntebeck et al.

(10) Patent No.: US 11,651,325 B2
(45) Date of Patent: May 16, 2023

(54) ITEM DELIVERY OPTIMIZATION

(71) Applicant: AirWatch LLC, Atlanta, GA (US)

(72) Inventors: Erich Stuntebeck, Marietta, GA (US); John DiRico, Atlanta, GA (US)

(73) Assignee: AirWatch LLC, Atlanta, GA (US)

( * ) Notice: Subject to any disclaimer, the term of this patent is extended or adjusted under 35 U.S.C. 154(b) by 323 days.

(21) Appl. No.: 16/722,346

(22) Filed: Dec. 20, 2019

(65) Prior Publication Data

US 2020/0167729 A1    May 28, 2020

Related U.S. Application Data

(63) Continuation of application No. 15/400,100, filed on Jan. 6, 2017, now Pat. No. 10,515,334, which is a continuation of application No. 14/178,516, filed on Feb. 12, 2014, now abandoned, which is a continuation-in-part of application No. 13/909,179, filed on Jun. 4, 2013, now abandoned.

(51) Int. Cl.
| | |
|---|---|
| *G06Q 10/00* | (2012.01) |
| *G06Q 10/0835* | (2023.01) |
| *G06Q 10/083* | (2023.01) |
| *G06Q 10/087* | (2023.01) |
| *G06Q 50/12* | (2012.01) |
| *G07C 9/32* | (2020.01) |

(52) U.S. Cl.
CPC ..... *G06Q 10/08355* (2013.01); *G06Q 10/083* (2013.01); *G06Q 10/087* (2013.01); *G06Q 50/12* (2013.01); *G07C 9/32* (2020.01)

(58) Field of Classification Search
CPC ........... G06Q 10/08355; G06Q 10/083; G06Q 10/087

See application file for complete search history.

(56) References Cited

U.S. PATENT DOCUMENTS

| | | | |
|---|---|---|---|
| 6,023,708 | A | 2/2000 | Mendez et al. |
| 6,085,192 | A | 7/2000 | Mendez et al. |
| 6,131,096 | A | 10/2000 | Ng et al. |
| 6,131,116 | A | 10/2000 | Riggins et al. |
| 6,151,606 | A | 11/2000 | Mendez |
| 6,233,341 | B1 | 5/2001 | Riggins |
| 6,560,772 | B1 | 5/2003 | Slinger |
| 6,708,221 | B1 | 3/2004 | Mendez et al. |
| 6,714,859 | B2 | 3/2004 | Jones |
| 6,726,106 | B1 | 4/2004 | Han et al. |
| 6,727,856 | B1 | 4/2004 | Hill |
| 6,741,232 | B1 | 5/2004 | Siedlikowski et al. |
| 6,741,927 | B2 | 5/2004 | Jones |
| 6,766,454 | B1 | 7/2004 | Riggins |
| 6,779,118 | B1 | 8/2004 | Ikudome et al. |
| 6,904,359 | B2 | 6/2005 | Jones |
| 6,965,876 | B2 | 11/2005 | Dabbiere |
| 6,995,749 | B2 | 2/2006 | Friend |

(Continued)

*Primary Examiner* — Rokib Masud
(74) *Attorney, Agent, or Firm* — Thomas | Horstemeyer, LLP

(57) ABSTRACT

Item delivery optimization may be provided. Items may be identified as available for delivery at a first location to at least one second location. A route from the first location to the second location may be calculated and at least a portion of the route from the first location to the second location may be provided to a delivery mechanism, such as an automated delivery device and/or a user.

20 Claims, 5 Drawing Sheets

(56) References Cited

U.S. PATENT DOCUMENTS

| | | |
|---|---|---|
| 7,032,181 B1 | 4/2006 | Farcasiu |
| 7,039,394 B2 | 5/2006 | Bhaskaran |
| 7,039,679 B2 | 5/2006 | Mendez et al. |
| 7,064,688 B2 | 6/2006 | Collins et al. |
| 7,092,943 B2 | 8/2006 | Roese et al. |
| 7,184,801 B2 | 2/2007 | Farcasiu |
| 7,191,058 B2 | 3/2007 | Laird et al. |
| 7,203,959 B2 | 4/2007 | Nachenberg et al. |
| 7,225,231 B2 | 5/2007 | Mendez et al. |
| 7,228,383 B2 | 6/2007 | Friedman et al. |
| 7,275,073 B2 | 9/2007 | Ganji et al. |
| 7,284,045 B1 | 10/2007 | Marl et al. |
| 7,287,271 B1 | 10/2007 | Riggins |
| 7,308,703 B2 | 12/2007 | Wright et al. |
| 7,310,535 B1 | 12/2007 | Mackenzie et al. |
| 7,353,533 B2 | 4/2008 | Wright et al. |
| 7,363,349 B2 | 4/2008 | Friedman et al. |
| 7,363,361 B2 | 4/2008 | Tewari et al. |
| 7,373,517 B1 | 5/2008 | Riggins |
| 7,437,752 B2 | 10/2008 | Heard et al. |
| 7,444,375 B2 | 10/2008 | McConnell et al. |
| 7,447,506 B1 | 11/2008 | Mackenzie et al. |
| 7,447,799 B2 | 11/2008 | Kushner |
| 7,475,152 B2 | 1/2009 | Chan et al. |
| 7,539,665 B2 | 5/2009 | Mendez |
| 7,565,314 B2 | 7/2009 | Borgeson et al. |
| 7,590,403 B1 | 9/2009 | House et al. |
| 7,594,224 B2 | 9/2009 | Patrick et al. |
| 7,603,547 B2 | 10/2009 | Patrick et al. |
| 7,603,548 B2 | 10/2009 | Patrick et al. |
| 7,603,703 B2 | 10/2009 | Craft et al. |
| 7,617,222 B2 | 11/2009 | Coulthard et al. |
| 7,620,001 B2 | 11/2009 | Ganji |
| 7,620,392 B1 | 11/2009 | Maurya et al. |
| 7,650,491 B2 | 1/2010 | Craft et al. |
| 7,660,902 B2 | 2/2010 | Graham et al. |
| 7,665,118 B2 | 2/2010 | Mann et al. |
| 7,665,125 B2 | 2/2010 | Heard et al. |
| 7,685,645 B2 | 3/2010 | Doyle et al. |
| 7,702,322 B1 | 4/2010 | Maurya et al. |
| 7,702,785 B2 | 4/2010 | Bruton, III et al. |
| 7,735,112 B2 | 6/2010 | Kim et al. |
| 7,735,122 B1 | 6/2010 | Johnson et al. |
| 7,739,334 B1 | 6/2010 | Ng et al. |
| 7,752,166 B2 | 7/2010 | Quinlan et al. |
| 7,788,382 B1 | 8/2010 | Jones et al. |
| 7,792,297 B1 | 9/2010 | Piccionelli et al. |
| 7,840,631 B2 | 11/2010 | Farcasiu |
| 7,890,091 B2 | 2/2011 | Puskoor et al. |
| 7,912,896 B2 | 3/2011 | Wolovitz et al. |
| 7,917,641 B2 | 3/2011 | Crampton |
| 7,970,386 B2 | 6/2011 | Bhat et al. |
| 7,983,995 B2 | 7/2011 | Murphy et al. |
| 3,001,082 A1 | 8/2011 | Muratov |
| 3,012,219 A1 | 9/2011 | Mendez et al. |
| 3,041,778 A1 | 10/2011 | Krabach et al. |
| 8,046,823 B1 | 10/2011 | Begen et al. |
| 8,060,074 B2 | 11/2011 | Danford et al. |
| 8,069,144 B2 | 11/2011 | Quinlan et al. |
| 8,078,157 B2 | 12/2011 | Maurya et al. |
| 8,094,591 B1 | 1/2012 | Hunter et al. |
| 8,117,344 B2 | 2/2012 | Mendez et al. |
| 8,150,431 B2 | 4/2012 | Wolovitz et al. |
| 2001/0001750 A1 | 8/2001 | Hara |
| 2002/0013721 A1 | 1/2002 | Dabbiere et al. |
| 2002/0188492 A1* | 12/2002 | Borton ............ G06Q 10/06316 705/7.31 |
| 2003/0110084 A1 | 6/2003 | Eberhard et al. |
| 2003/0204716 A1 | 10/2003 | Rockwood et al. |
| 2004/0123153 A1 | 6/2004 | Wright et al. |
| 2004/0181687 A1 | 9/2004 | Nachenberg et al. |
| 2004/0224703 A1 | 11/2004 | Takaki et al. |
| 2005/0246192 A1 | 11/2005 | Jauffred et al. |
| 2006/0190984 A1 | 8/2006 | Heard et al. |
| 2006/0223518 A1 | 10/2006 | Haney |
| 2007/0033397 A1 | 2/2007 | Phillips, II et al. |
| 2007/0136492 A1 | 6/2007 | Blum et al. |
| 2007/0156897 A1 | 7/2007 | Lim |
| 2007/0174433 A1 | 7/2007 | Mendez et al. |
| 2007/0288637 A1 | 12/2007 | Layton et al. |
| 2008/0133712 A1 | 6/2008 | Friedman et al. |
| 2008/0134305 A1 | 6/2008 | Hinton et al. |
| 2008/0201453 A1 | 8/2008 | Assenmacher |
| 2008/0275643 A1* | 11/2008 | Yaqub ................. G01C 21/343 340/995.19 |
| 2009/0036111 A1 | 2/2009 | Danford et al. |
| 2009/0048890 A1* | 2/2009 | Burgh .............. G06Q 10/06375 705/7.26 |
| 2009/0144632 A1 | 6/2009 | Mendez |
| 2009/0260064 A1 | 10/2009 | McDowell et al. |
| 2009/0300739 A1 | 12/2009 | Nice et al. |
| 2009/0307362 A1 | 12/2009 | Mendez et al. |
| 2010/0005125 A1 | 1/2010 | Mendez et al. |
| 2010/0005157 A1 | 1/2010 | Mendez et al. |
| 2010/0005195 A1 | 1/2010 | Mendez et al. |
| 2010/0023630 A1 | 1/2010 | Mendez et al. |
| 2010/0100641 A1 | 4/2010 | Quinlan et al. |
| 2010/0120450 A1 | 5/2010 | Herz |
| 2010/0144323 A1 | 6/2010 | Collins et al. |
| 2010/0146269 A1 | 6/2010 | Baskaran |
| 2010/0254410 A1 | 10/2010 | Collins |
| 2010/0268844 A1 | 10/2010 | Quinlan et al. |
| 2010/0273456 A1 | 10/2010 | Wolovitz et al. |
| 2010/0299152 A1 | 11/2010 | Batchu et al. |
| 2010/0299362 A1 | 11/2010 | Osmond |
| 2010/0299376 A1 | 11/2010 | Batchu et al. |
| 2010/0299719 A1 | 11/2010 | Burks et al. |
| 2011/0004941 A1 | 1/2011 | Mendez et al. |
| 2011/0082900 A1 | 4/2011 | Nagpal et al. |
| 2011/0113062 A1 | 5/2011 | Quinlan et al. |
| 2011/0145932 A1 | 6/2011 | Nerger et al. |
| 2011/0153779 A1 | 6/2011 | Mendez et al. |
| 2011/0153799 A1 | 6/2011 | Ito |
| 2011/0167474 A1 | 7/2011 | Sinha et al. |
| 2011/0202589 A1 | 8/2011 | Piernot et al. |
| 2011/0225252 A1 | 9/2011 | Bhat et al. |
| 2011/0270799 A1 | 11/2011 | Muratov |
| 2011/0276805 A1 | 11/2011 | Nagpal et al. |
| 2011/0296186 A1 | 12/2011 | Wong et al. |
| 2011/0320552 A1 | 12/2011 | Friedman et al. |
| 2012/0005578 A1 | 1/2012 | Hawkins |
| 2012/0015644 A1 | 1/2012 | Danford et al. |
| 2012/0102392 A1 | 4/2012 | Reesman et al. |
| 2012/0198547 A1 | 8/2012 | Fredette et al. |
| 2012/0209730 A1 | 8/2012 | Garrett et al. |
| 2013/0152169 A1 | 6/2013 | Stuntebeck |

* cited by examiner

ITEM DELIVERY OPTIMIZATION

RELATED APPLICATION

This application is a continuation of U.S. patent application Ser. No. 15/400,100, filed Jan. 6, 2017, which is a continuation of U.S. patent application Ser. No. 14/178,516, filed on Feb. 2, 2012, which is a continuation-in-part of U.S. patent application Ser. No. 13/909,179, filed on Jun. 4, 2013, the entire contents of all applications, which are hereby incorporated herein by reference in their entirety.

BACKGROUND

Item delivery optimization provides for dynamic delivery route optimization when a destination may be mobile. In some situations, recipients for ordered items may be mobile and/or may be situated at a non-fixed location. For example, restaurant food ordered via counter service may need to be provided to patrons who are free to select their own table, or medications may need to be delivered to patients in a hospital who may move from room to room for exams, tests, procedures, etc. Similarly, mail packages may need to be delivered to office workers whose work locations may change due to reorganizations, remodeling, travel between office locations, meetings in conference rooms, etc. Conventional approaches address this problem by delivering the items to a location specified at the time the order is placed, or by forcing the delivery courier to locate the recipient manually. These approaches often result in delays in the delivery.

SUMMARY

This Summary is provided to introduce a selection of concepts in a simplified form that are further described below in the Detailed Description. This Summary is not intended to identify key features or essential features of the claimed subject matter. Neither is this Summary intended to be used to limit the claimed subject matter's scope.

Item delivery optimization may be provided. Items may be identified as available for delivery at a first location to at least one second location. A route from the first location to the second location may be calculated and at least a portion of the route from the first location to the second location may be provided to a delivery mechanism, such as an automated delivery device and/or a user.

It is to be understood that both the foregoing general description and the following detailed description are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the detailed description.

BRIEF DESCRIPTION OF THE DRAWINGS

Many aspects of the present disclosure can be better understood with reference to the following diagrams. The drawings are not necessarily to scale. Instead, emphasis is placed upon clearly illustrating certain features of the disclosure. Moreover, in the drawings, like reference numerals designate corresponding parts throughout the several views. In the drawings.

DETAILED DESCRIPTION

Figure 1:
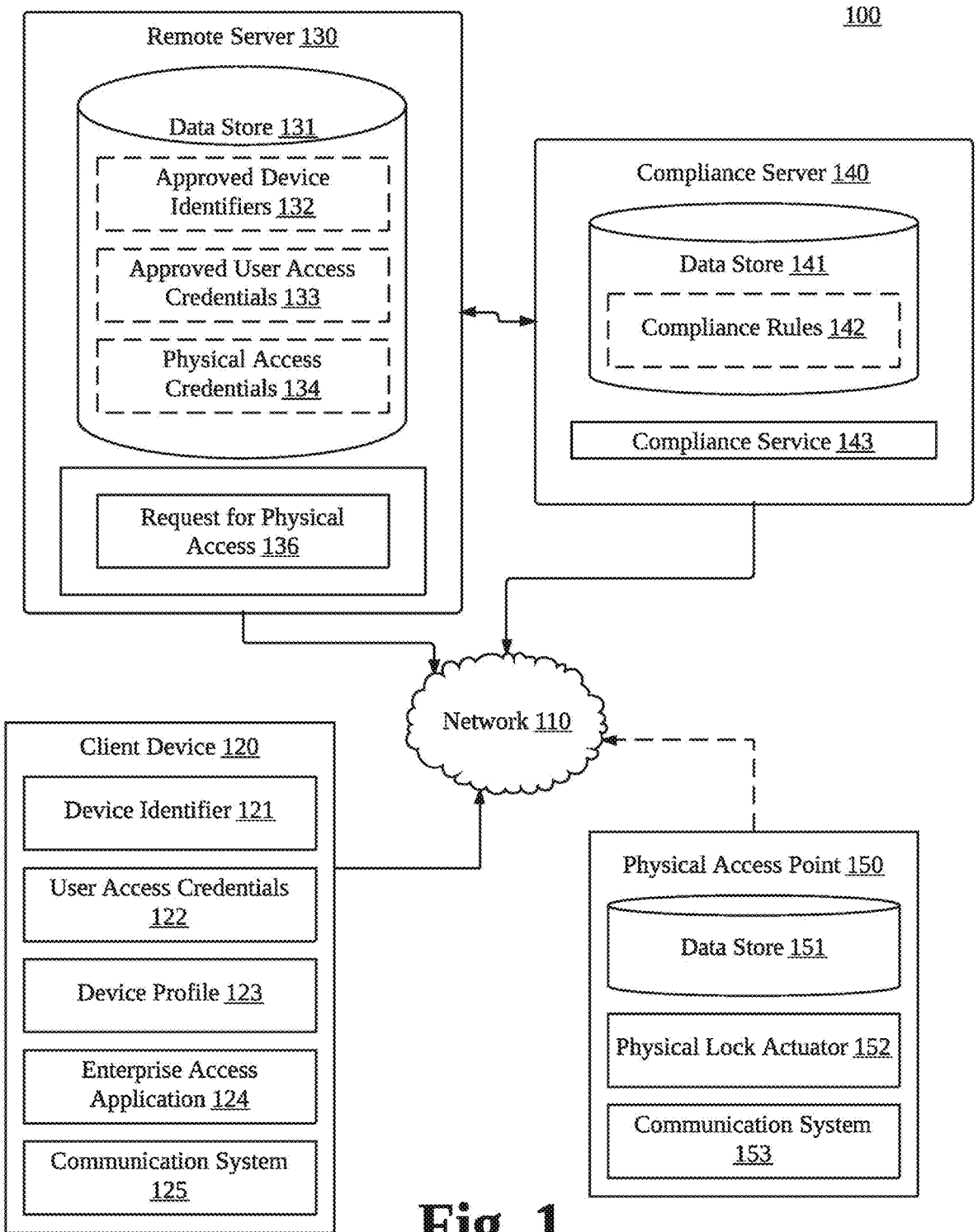
FIG. 1 is a block diagram of an operating environment for providing device management.

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Item delivery optimization may be provided. There are many situations in which items need to be delivered to various recipients, such as food orders in a restaurant or mail and packages throughout an office building. In many of these situations, the person responsible for delivery of these items may not know where the recipients are currently located. For example, workers in a flexible environment may often move between desks or change areas to coordinate with other workers. For another example, patrons at a counter service restaurant or food truck may order and pick their own place to sit or wander around while waiting for their food to be ready. In such cases, it would be helpful for the person responsible for delivery to not only be able to easily locate the recipients, but to work out an optimal and efficient delivery route.

Traditional approaches to route optimization are often described as solutions to the 'shortest route problem' or the 'traveling salesman problem'. These solutions include, but are not limited to Dijkstra's algorithm, the Bellman-Ford algorithm, the Floyd-Warshall algorithm, and Johnson's algorithm. Such mathematical approaches are well known when the endpoints of a routing calculation are fixed, such as when a road network is mapped to identify a route for a global positioning system (GPS) navigation device.

For example, a road network can be considered as a graph with positive weights. The nodes represent road junctions and each edge of the graph is associated with a road segment between two junctions. The weight of an edge may correspond to the length of the associated road segment, the time needed to traverse the segment or the cost of traversing the segment. Using directed edges it is also possible to model one-way streets. Such graphs are special in the sense that some edges are more important than others for long distance travel (e.g. highways). There are a great number of algorithms that exploit this property and are therefore able to compute the shortest route a lot quicker than would be possible on general graphs.

Many of these algorithms work in two phases. In the first phase, the graph is preprocessed without knowing the source (origination) or target (destination) node. The second phase is the query phase. In this phase, source and target node are known. The idea is that the road network is static, so the preprocessing phase can be done once and used for a large number of queries on the same road network. The algorithm with the fastest known query time is called hub labeling.

In scenarios such as restaurant food delivery and mail delivery described above, the pre-processing can be done based on building schematics, and may include factors such as one-way doors (often used in restaurant settings), elevator availability and speed, major pathways and hallways versus side corridors, and measurements that take into account the necessity of moving equipment through certain areas. For example, delivery carts of a known width may be needed to move heavy or large packages, and the pre-processing phase may evaluate which hallways are suitable for such a cart as opposed to those that may be too narrow, that utilize doors that may not accommodate the cart, or areas which are not accessible at all, whether due to space constraints, lack of elevator access, lack of security access, or similar restrictions.

The pre-processing phase is particularly important in scenarios in which the recipients may be moving around. In such cases, the query phase may need to be recalculated each time a recipient is determined to have changed locations. For example, a mail delivery courier may be distributing packages to several people on the same floor when one of the recipients is determined to have changed floors. The courier's route may then be updated to complete the deliveries on the current floor before redirecting that courier to the recipient who has moved.

The technical effects of some embodiments of this disclosure may include establishing control of access to networks and resources for user devices when access lists may not be predefined, and reducing and/or eliminating the burden of predefining access lists to control access to networks and resources. Moreover, the technical effects of some embodiments may include enhancing network access control by assigning specific access rights based on access lists to client devices authorized to access associated network beacons and resources.

Other technical effects of some embodiments of this disclosure may offer group management solutions to managing content access and distribution. For example, users of a sales group may have read access to marketing documents and presentations, while users in a marketing group may be able to edit and/or annotate the market documents. Similarly, users in an accounting or business services group may be the only ones with access to enterprise financial documents. These access controls may be provided by distributing authorization credentials to devices associated with users of the respective group. Each user may then authenticate to their device, such as by inputting a username, password, authentication key, and/or biometric data, before the device may access and/or retrieve the content authorized for distribution to that device. These authentication types are provided as examples only and are not intended to be limiting as many other types of user authentication are in use and/or may be contemplated in the future.

Content access may be further limited by policies that enforce other compliance restrictions based on properties of the device such as time, location, device security and/or integrity, presence of another device, software versions, required software, etc. For example, educational settings may designate student and instructor groups. These groups may be further assigned to specific classes such that only student group members associated with a given class may access content associated with that class. Further, edit access to the content for the class may be restricted to the user(s) in the instructor group and/or student group members may be permitted to add content that only the instructor may view (e.g., homework assignments.) In some embodiments, the instructor group user(s) may be able to push content to student group user(s) and/or activate temporary control of the students' devices to prevent the devices from accessing non-class related content during class time.

To reduce the cost of ownership of user devices and cellular and/or data service charges associated with use of such user devices, an enterprise such as an educational institution and/or a business may implement a "bring your own device" (BYOD) policy to allow an employee to use his/her personal device to access enterprise resources rather than provide the user with an enterprise owned user device for such purpose. To support such a BYOD policy, a user device administrator (i.e. IT administrator) may manage a group of personally owned user devices, via a management application executed by a management server in communication with the user devices over a network, to provide the user devices with secure access to enterprise resources.

The user device administrator may enroll user devices into the management system to monitor the user devices for security vulnerabilities and to configure the user devices for secure access to enterprise resources. The user device administrator may create and/or configure at least one configuration profile via a user interface provided by the management system. A configuration profile may comprise a set of instructions and/or settings that configure the operations and/or functions of a user device, which may ensure the security of the accessed resources. The user device administrator may, for instance, configure an enterprise email configuration profile by specifying the network address and access credentials of an enterprise email account that the users of the user devices are authorized to access. Other configuration policies may include, but are not limited to, hardware, software, application, function, cellular, text message, and data use restrictions, which may be based at least in part on the current time and/or location of the restricted user device. The user device administrator may thereafter deploy the configuration profiles to specific user devices, such as to groups of user devices of users with similar roles, privileges and/or titles.

Access credentials may uniquely identify a client device and/or the user of the client device. For example, the access credentials for a user may comprise a username, a password, and/or biometric data related to facial recognition, retina recognition, fingerprint recognition, and the like. Access credentials related to a device may uniquely identify the device and may comprise, for example, a unique hardware identifier such as a GUID (Globally Unique Identifier), UUID (Universally Unique Identifier), UDID (Unique Device Identifier), serial number, IMEI (Internationally Mobile Equipment Identity), Wi-Fi MAC (Media Access Control) address, Bluetooth MAC address, a CPU ID, and/or the like, or any combination of two or more such hardware identifiers. Additionally, the access credentials may be represented by a unique software identifier such a token or certificate, based at least in part on the aforementioned unique hardware identifiers.

The user devices may also have access to personal configuration profiles that may be created by the users of the user devices. The user devices may, for instance, have access to a personal email configuration profile that was created by a user of the user device to provide access to her personal email account. Thus, a user device enrolled in a BYOD management system may have more than one configuration profile for a given use of the user device, such as a personal email configuration profile and an enterprise email configuration profile that are both used for accessing email accounts on the user device.

The user devices may be instructed to enable and/or disable certain configuration profiles according to authorization rights specified by the user device administrator, such as location and/or time-based authorization rights. For example, a BYOD policy may specify that user devices enrolled in the BYOD management system are authorized for personal use outside of the workday and are authorized for business use during the workday. Similarly, a BYOD device may be restricted to enterprise uses while in work locations and/or prohibited from accessing enterprise resources while outside of secure work locations. To implement such a policy, a user device administrator may instruct the user devices to toggle between personal configuration policies and enterprise configuration policies based on factors such as the current time and/or location associated with the user device.

The current time may be based on the current time at the current location of the user device, which may be determined by GPS, Wi-Fi, Cellular Triangulation, etc., or may be based on the current time at a configured primary location associated with the user device, which may be the primary office location of an employee user of the user device. As an example, time-based configuration profile toggling may be provided by instructing a user device to enable business configuration profiles and disable personal configuration profiles while the current time is between 9 AM and 5 PM at the current location of the user device, and to disable business configuration profiles and enable personal configuration profiles while the current time is between 5 PM and 9 AM at the current location of the user device.

FIG. 1 illustrates a networked environment 100 according to various embodiments. The networked environment 100 includes a network 110, a client device 120, a remote server 130, a compliance server 140, and a physical access point 150. The network 110 includes, for example any type of wireless network such as a wireless local area network (WLAN), a wireless wide area network (WWAN), and/or any other type of wireless network now known and/or later developed. Additionally, the network 110 includes the Internet, intranets, extranets, microwave networks, satellite communications, cellular systems, PCS, infrared communications, global area networks, and/or other suitable networks, etc., and/or any combination of two or more such networks. Embodiments consistent with this disclosure are described below in connection with WWANs (as illustrated in FIG. 1); however, it should be understood that embodiments described herein may be used to advantage in any type of wireless network.

In some embodiments, the network 110 facilitates the transport of data between at least one client device, such as client device 120, the remote server 130, the compliance server 140, and the physical access point 150. Client devices may include a laptop computer, a personal digital assistant, a cellular telephone, a set-top device, music players, web pads, tablet computer systems, game consoles, and/or other devices with like capability. Client device 120 comprises a wireless network connectivity component, for example, a PCI(Peripheral Component Interconnect) card, USB(Universal Serial Bus), PCMCIA (Personal Computer Memory Card International Association) card, SDIO (Secure Digital Input-Output) card, NewCard, Cardbus, a modem, a wireless radio transceiver (including an RFID transceiver), and/or the like. Additionally, the client device 120 may include a processor for executing applications and/or services, and a memory accessible by the processor to store data and other information. The client device 120 is operable to communicate wirelessly with the remote server 130 and the physical access point 150 with the aid of the wireless network connectivity component.

Additionally, the client device 120 may store in memory a device identifier 121, user access credentials 122, a device profile 123, and potentially other data. In some embodiments, the device identifier 121 may include a software identifier, a hardware identifier, and/or a combination of software and hardware identifiers. For instance, the device identifier 121 may be a unique hardware identifier such as a MAC address, a CPU ID, and/or other hardware identifiers. The user access credentials 122 may include a username, a password, and/or biometric data related to facial recognition, retina recognition, fingerprint recognition, and the like. Additionally, the device profile 123 may include a listing of hardware and software attributes that describe the client device 120. For instance, the device profile 123 may include hardware specifications of the client device 120, version information of various software installed on the client device 120, and/or any other hardware/software attributes. Additionally, the device profile 123 may also include data indicating a date of last virus scan, a date of last access by IT, a date of last tune-up by IT, and/or any other data indicating a date of last device check.

The client device 120 may further be configured to execute various applications such as an "enterprise access application" 124. The enterprise access application 124 may be executed to transmit a request for a physical access credential. One such credentials are received, they may be stored on the client device 120 for later reference and/or transmission, possible via communication system 125. Communication system 125 may be the same or different than the wireless network connectivity component previously discussed, include the same or different communication abilities, and may at least be specifically able to communicate with physical access points 150, discussed below.

The client device 120 may also be configured to execute other applications such as, for example, browser applications, email applications, instant message applications, word processing applications, spreadsheet applications, database applications, and/or other applications. For instance, a browser and/or word processing application may be executed in the client device 120, for example, to access and render network pages, such as web pages, documents, and/or other network content served up by remote server 130, the compliance server 140, and/or any other computing system.

The remote server 130 and the compliance server 140 can each be implemented as, for example, a server computer and/or any other system capable of providing computing capability. Further, the remote server 130, compliance server 140, and any other system described herein may be configured with logic for performing the methods described in this disclosure. Although one remote server 130 and one compliance server 140 are depicted in FIG. 1, certain embodiments of the networked environment 100 include more than one remote server 130 and/or compliance server 140. At least one of the servers may be employed and arranged, for example, in at least one server bank, computer bank, and/or other arrangements. For example, the server computers together may include a cloud computing resource, a grid computing resource, and/or any other distributed computing arrangement. Such server computers may be located in a single installation and/or may be distributed among many different geographical locations. For purposes of convenience, the remote server 130 and the compliance server 140 are each referred to herein in the singular.

Various applications and/or other functionality may be executed in the remote server 130 and the compliance server 140, respectively, according to certain embodiments. Also, various data is stored in a data store 131 that is part of and/or otherwise accessible to the remote server 130 and/or a data store 141 that is part of and/or otherwise accessible to the compliance server 140. The data stored in each of the data stores 131 and 141, for example, may be accessed, modified, removed, and/or otherwise manipulated in association with the operation of the applications and/or functional entities described herein.

The components executed in the remote server 130 include a authentication service 135, and may include other applications, services, processes, systems, engines, and/or functionality not discussed in detail herein. As used herein, the term "authentication service" is meant to generally refer to computer-executable instructions for performing the functionality described herein for authorizing and distributing physical access credentials 136. The authentication service 135 is executed to receive a request for physical access 136 from an enterprise access application 124 executed on a client device 120 and to determine whether to grant or deny the request 136. Upon determining to grant the request 136, the authentication service 135 may then send physical access credentials 134, as will be described.

The data stored in the data store 131 of the remote server 130 may include, for example, approved device identifiers 132, approved user access credentials 133, physical access credentials 134, and potentially other data. The approved device identifiers 132 represents a listing of device identifiers 121 that have been pre-approved for potential accessing physical access credentials 134 which will entitle holders of client devices 120 to physical access at physical access points 150. The approved device identifiers 132 may have been previously provided to the remote server 130 by a system administrator and/or the like. The approved user access credentials 133 represents a listing of user access credentials 122 that have been pre-approved for potential accessing physical access credentials 134 which will entitle them to physical access at physical access points 150.

The components executed in the compliance server 140 include a compliance service 143, and may include other applications, services, processes, systems, engines, and/or functionality not discussed in detail herein. As used herein, the term "compliance service" is meant to generally refer to computer-executable instructions for performing the functionality described herein for authorizing the device characteristics of another device, such as a client device 120. The first compliance service 143 is executed to determine whether the device characteristics of the client device 120 comply with the compliance rules 142 that are stored in the data store 141. For instance, the compliance service 143 may identify the device characteristics from the device profile 123 of each client device 120. Additionally, the compliance rules 142 represents a listing of hardware restrictions, software restrictions, and/or mobile device management restrictions that need to be satisfied by the client device 120 for use of physical access credentials 134.

In some embodiments, hardware restrictions included in the compliance rules 142 may comprise restrictions regarding use of specific client devices 120 and specific client device features, such as, for instance, cameras, Bluetooth, IRDA, tethering, external storage, a mobile access point, and/or other hardware restrictions. Software restrictions included in the compliance rules 142 may comprise restrictions regarding the use of specific client device operating systems and/or other applications 125, internet browser restrictions, screen capture functionality, and/or other software restrictions. Mobile device management restrictions included in the compliance rules 142 comprise encryption requirements, firmware versions, remote lock and wipe functionalities, logging and reporting features, GPS tracking, and/or other mobile device management features.

The compliance service 143 may determine whether the device characteristics of a client device 120 satisfy at least one of the restrictions enumerated in the compliance rules 142. For example, the compliance service 143 may determine that a client device 120 that has a camera, Bluetooth capability, and is executing a specified version of an operating system is compliant with the compliance rules 142. As another example, the compliance service 143 may determine that a client device 120 that is associated with an external storage unit and has screen capture functionality enabled is not compliant with the compliance rules 142. All of these restrictions discussed above may affect whether the client device 120 is entitled to use a given physical access credential 134. In some embodiments, however, the compliance service 143 may not be used and physical access authorization may be determined solely based on approved user access credentials 133 and/or approved device identifiers 132.

A user operating a client device 120 may wish to receive at least one physical access credential 134 so that the user may physical access a building, location, door, gate, drawer, filing cabinet, storage unit, cabinet, etc. In some embodiments, the user may interact with an input device to manipulate a network page displayed by a locally executed application, such as a browser application, to generate the request for physical access 136. In some embodiments, the user may manipulate a user interface generated by a locally executed application to generate the request 136. In either case, the user may provide login information and/or the application may automatically retrieve the login information from the memory of the client device 120. Login information may be, for instance, a unique user name, a password, biometric data, and/or other types of user access credentials 122. The application may then communicate the request to the enterprise access application 124, which may generate and transmit the request 136 to the authentication service 135. In some embodiments, the enterprise access application 124 may itself receive the input from the user directly and then transmit the access request 136 to the remote server 130.

Upon receiving the request 136, the authentication service 135 determines whether to grant or deny the request 136. In some embodiments, the authentication service 135 may first authenticate the client device 120 and the user operating the client device 120. To this end, the authentication service 135 determines whether the device identifier 121 associated with the client device 120 matches one of the identifiers listed in the listing of approved identifiers 132. For instance, the device identifier 121 of the client device 120 may be included as part of the request 136 transmitted by the enterprise access application 124. In some embodiments, the authentication service 135 may request the device identifier 121 from the client device 120 in response to receiving the access request 136. Upon identifying and/or receiving the device identifier 121, the authentication service 135 determines whether the device identifier 121 matches one of the approved identifiers 132 stored in the data store 131. In some embodiments, the authentication service 135 may authenticate the client device 120 dynamically by determining whether the device identifier 121 is within a predetermined range of approved device identifiers 132. In some embodiments, the authentication service 135 may authenticate the client device 120 dynamically by performing an algorithm on the device identifier 121.

Additionally, the authentication service 135 may also authenticate the user operating the client device 120 by determining whether the user access credentials 122 associated with the user match one of the credentials in the listing of approved user access credentials 133. For instance, the user access credentials 122 associated with the user on the client device 120 may be included as part of the access request 136 transmitted by the enterprise access application 124. In some embodiments, the authentication service 135 may request the user access credentials 122 from the client device 120 in response to receiving the access request 136. Upon identifying and/or requesting the user access credentials 122, the authentication service 135 may determine whether the user access credentials 122 matches one of the approved user access credentials 133 stored in the data store 131. In some embodiments, the authentication service 135 may authenticate the user operating the client device 120 without also authenticating the client device 120. In other words, certain authenticated users may be authorized to gain the requested physical access regardless of what device they used to submit the physical access request 136.

In some embodiments, having authenticated the client device 120 and the user operating the client device 120 as authorized to receive the physical access credential 134, the authentication service 135 communicates with the compliance service 143 to further authorize the client device 120 to receive the physical access credential 134. In some embodiments, the compliance service 143 authorizes the client device 120 by determining whether device characteristics of the client device 120 comply with applicable compliance rules 142. For instance, the compliance service 143 may identify the device characteristics of the client device 120 from the device profile 123. All or part of the device profile 123 may have been provided by the client device 120 in conjunction with the request 136 and/or may be subsequently requested from the client device 120 by the authentication service 135 and/or the compliance service 143. The compliance service 143 then analyzes the device characteristics to determine whether the software restrictions, hardware restrictions, and/or device management restrictions defined in the compliance rules 142 are satisfied and returns the result of the determination to the authentication service 135. In an alternative embodiment, the authentication service 135 may include and perform functionality for determining whether the client device 120 complies with the compliance rules 143.

If the authentication service 135 determines and/or receives a determination that the client device 120 is authorized, the authentication service 135 then associates the client device 120 with at least one physical access credential 134. In some embodiments, the authentication service 135 sends the physical access credentials 134 to the client device 120 and authorizes the client device 120 to use such credentials in connection with accessing physical access points 150. In some embodiments, the authentication service 135 may also send the physical access credentials to physical access point 150.

In some embodiments, the physical access credential 134 may be revoked at any time by the remote server 130. Revocation may occur for any number of reasons, including but not limited to, a change in device profile 123, a change in approved device identifiers 132, a change in approved user access credentials 133, expiration of a defined time period, and/or a request from the user of the client device 120.

In some embodiments, the physical access point 150 is an electro-mechanical device capable of sending and/or receiving information, and in response thereto opening a physical barrier, for example a building, location, door, gate, drawer, filing cabinet, storage unit, cabinet, etc. Depending on the embodiment, the physical access point may or may not be in communication with network 110 and servers and devices connected therewith. In these embodiments, the physical access point may have authorized physical access credentials 134 embedded and/or stored therein, either in a ROM-type storage unit, and/or in a non-networked RAM-type storage unit. A non-networked RAM-type storage unit could be updated locally by direct connection via USB and/or the like, with additional security mechanisms to prevent unwanted tampering/changing of the embedded/stored physical access credentials 134.

The physical access point 150 may include a data store 151 for maintaining data and/or applications which relate to determining whether a client device 120 may be allowed access by the physical access point 150. In some embodiments, the data store 151 may only include a single access code and/or datum that is expected to be matched by any client device 120 providing the same, thereby entitling the client device 120 to access beyond the physical barrier. In some embodiments, the data store 151 may include a plurality of access codes, any of which may be matched by a client device 120 to verify authority to access beyond the physical barrier. The physical access point may have a processor to implement such methods.

The physical access point 150 may also include a physical lock actuator 152, for example, a solenoid and/or other electro-mechanical actuator, which is operable to physically unlock the physical barrier upon command to do so by the physical access point 150. The physical access point may also include a communication system 153 for sending and receiving information with a client device 120 (for example, an RFID transceiver, a wireless radio transceiver, a near field communication device, and/or the like).

Figure 2:
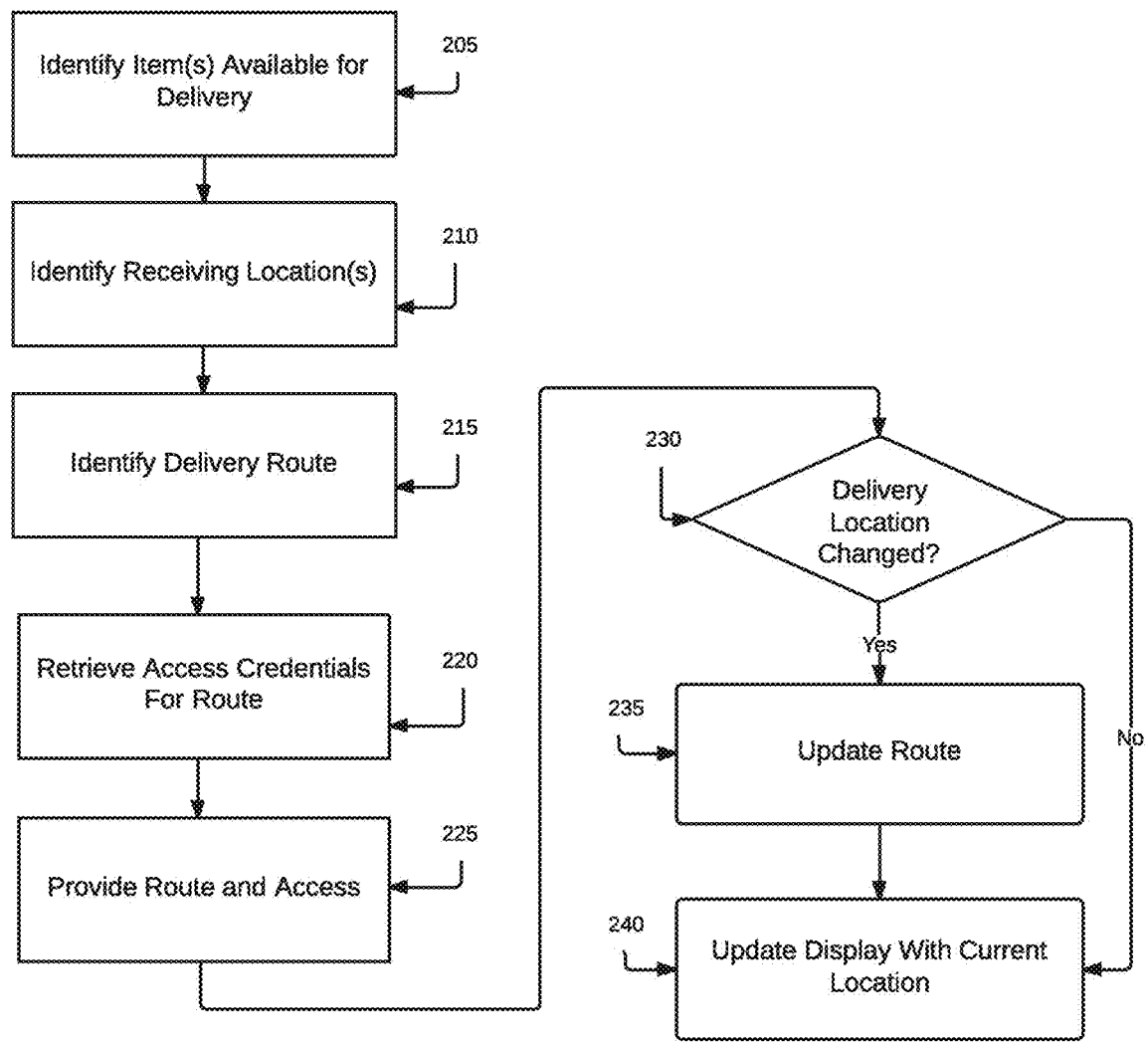
FIG. 2 is a flow chart illustrating a method for item delivery optimization.

FIG. 2 is a flow chart setting forth the general stages involved in a method 300 consistent with embodiments of this disclosure for providing item delivery optimization. Method 200 may be implemented using elements of operating environment 100 as described above and a schematic block diagram 400 as described below. Method 200 is described below with respect to operations performed by a computing device, with the understanding that such a computing device may comprise any number devices programmed for operation of any and/or all of the steps of method 200. The described computing device may comprise, for example, client device 120, remote server 130, compliance server 140, and/or physical access point 150. Ways to implement the stages of method 200 will be described in greater detail below. Method 200 may begin at stage 205 where a computing device may identify one and/or more items available for delivery. For example, remote server 130 may identify food and/or beverage items available for delivery to customers in a restaurant or bar, or a number of packages and mail items available for delivery to recipients within an office complex. Other scenarios in which method 200 may be employed comprise, for example, pickup and delivery of inventory items within a warehouse or multi-building storage complex and/or delivery of items around a geographic area, such as a city.

In some embodiments, the identified items may be selected based on factors such as known methods of transport, a priority for the available items and/or a known limit on the number of items that may be transported at a given time. For example, the number of items identified may be limited to the number of items able to be carried on a restaurant server's tray or on an office mail cart.

In some embodiments, the items available for delivery may be associated with multiple origination locations. For example, mail delivery items may originate from locations such as a mail sorting room, a loading dock, and a reception desk. Restaurant items may originate from a bar, a serving pass, multiple kitchens, hot or cold storage areas, etc.

In some embodiments, all items available for delivery within an environment may be identified at stage 205. Characteristics for the items may also be identified, such as size, weight, time the item has been available, assigned delivery person or mechanism, etc. These characteristics may be maintained by the computing device based on inputs from users associated with preparing the items for delivery and/or may be scanned into the computing device based on labels, order tickets, RFID tags, or other data sources associated with the items for delivery. Collection of these characteristics may aid in prioritization, ordering, selection, and/or routing of the items in other stages of method 200.

From stage 205, method 200 may advance to stage 210 where the computing device may identify receiving locations for the items available for delivery. For example, at least some of the items available for delivery may be associated with recipients located within a particular geographic area. Such an association may comprise a predefined delivery location (e.g., a particular table in a restaurant or a cubicle within an office building) and/or the association may comprise an association with a mobile device.

In a use case for some embodiments of this disclosure, for example, a restaurant patron may place an order at a front counter or a bar. The order may be associated with a mobile device operative to provide its location to a delivery dispatch computing device such as that described with respect to method 200. Such mobile devices may belong to the patron and/or may be provided by the restaurant. For example, the patron may register their cellular phone as a location identifier, using communication options built into the phone, such as wi-fi networking, near-field communications (NFC), radio frequency identifier tags (RFID), and/or Bluetooth. In some embodiments, the restaurant may issue a locatable mobile device, such as a pager, tablet, Bluetooth, NFC, or RFID tag, or other mobile device. The restaurant may provide receivers, such as wi-fi routers and NFC or RFID readers, around the geographic area for tracking the locations and movements of the locatable mobile devices. Such an arrangement may be similarly applied to other use cases, such as by using employees' devices to track their current locations within an office complex or campus.

From stage 210, method 200 may advance to stage 215 where the computing device may identify a delivery route. For example, a number of orders may be available for delivery from the kitchen to various tables within a restaurant. An optimized route from the kitchen to each of the table delivery locations may be computed according to various algorithms. The optimized route may take account of factors such as whether the delivery locations are on different floors, such that all items to be delivered on a first floor are routed to before items on another floor.

From stage 215, method 200 may advance to stage 220 where the computing device may retrieve access credentials needed for the optimized delivery route. For example, remote server 130 may determine whether the identified route will require passage through physical access point 150. If so, remote server 130 may associate physical access credentials 134 with the identified route. In various embodiments, the criteria for optimization of the delivery route may be different. For example, in some embodiments, optimization may refer to minimizing the time it takes to deliver the items and/or to delivering the items in a prioritized order. For example, a restaurant order item that has been waiting the longest may be prioritized and the route optimized to deliver that item first even if other delivery locations are physically closer.

From stage 220, method 200 may advance to stage 225 where the computing device may provide the route (and access credentials, if needed) to the delivery person and/or mechanism. For example, the route and credentials may be provided to a tablet and/or other GPS-type device associated with the user who will be performing the delivery of the items. In some embodiments, the route and credentials may be provided to an automated delivery mechanism, such as an un-manned forklift operating in a warehouse. For a person, the route may be displayed on a screen associated with the device; for an automated mechanism, such a display may be unnecessary.

From stage 225, method 200 may advance to stage 230 where the computing device may determine whether the delivery location for any of the items on the optimized route has changed. For example, the mobile devices associated with recipients of the items may be determined to have moved, such as when restaurant patrons are moving between tables or mingling in a bar area. Similarly, employees in an office complex may move between work areas, offices, labs, conference rooms, etc. In some embodiments, a delivery location may be changed by remote server 130 in response to a user input (e.g., changing of the delivery location identifier from one location to another, regardless of where the recipient is).

If the delivery location is determined to have changed at stage 230, method 200 may advance to stage 235 where the computing device may update the optimized route. For example, the route may display directions to the new delivery location. In some embodiments, this may result in a re-ordering of the delivery items, such as where a delivery location for a first item is determined to now be further away than a delivery location of a second item.

After updating the route at stage 235, or if no updates were determined to be required at stage 230, method 200 may advance to stage 240 where the computing device may update a current position of the delivery person and/or mechanism. For example, a waiter may have delivered two of the restaurant order items; the waiter's current location may be identified and the optimized route to the next delivery location may be displayed.

Figure 3A:
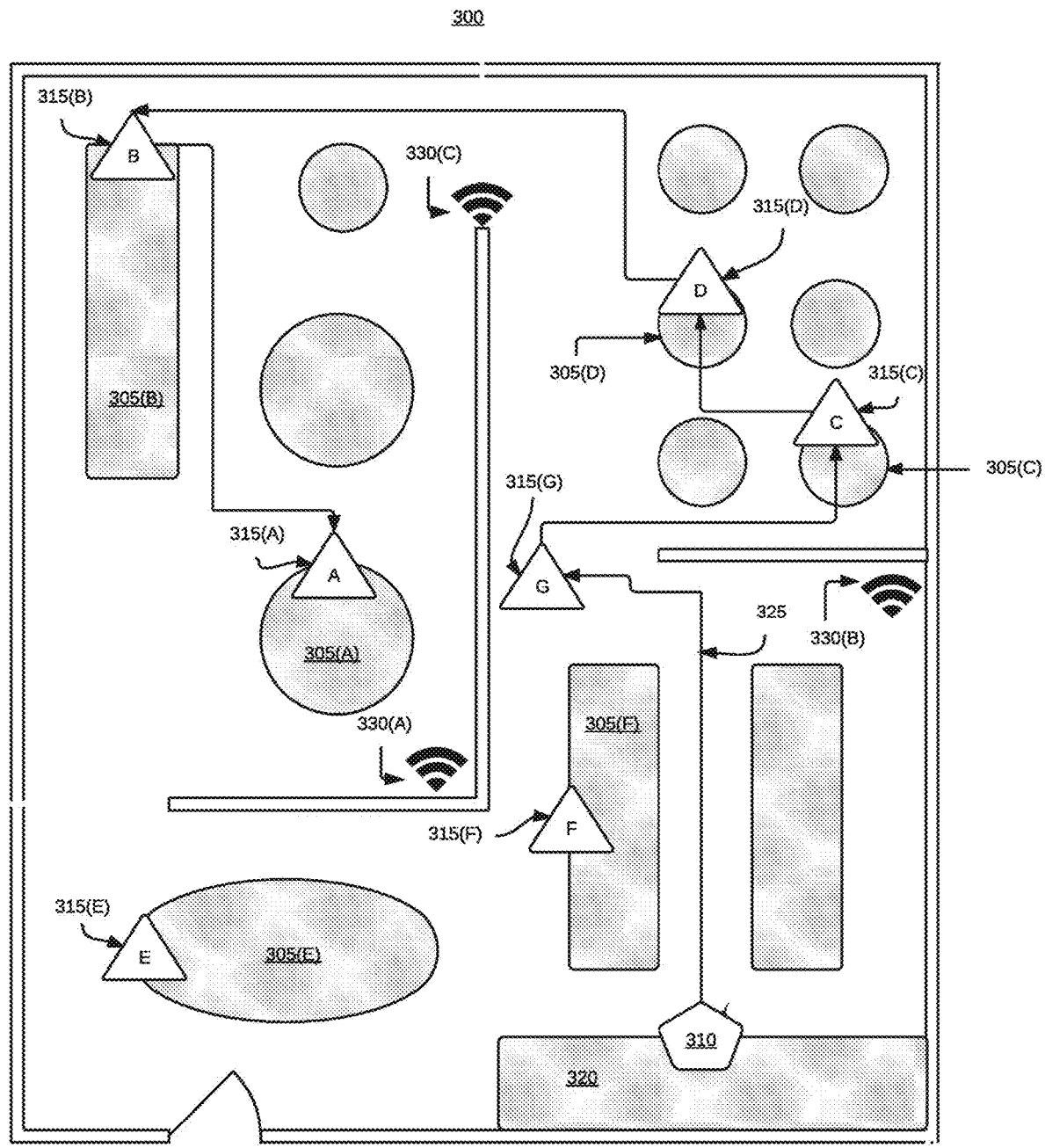
FIGS. 3A-3B are illustrations of an area in which delivery optimization may be used.
Figure 3B:
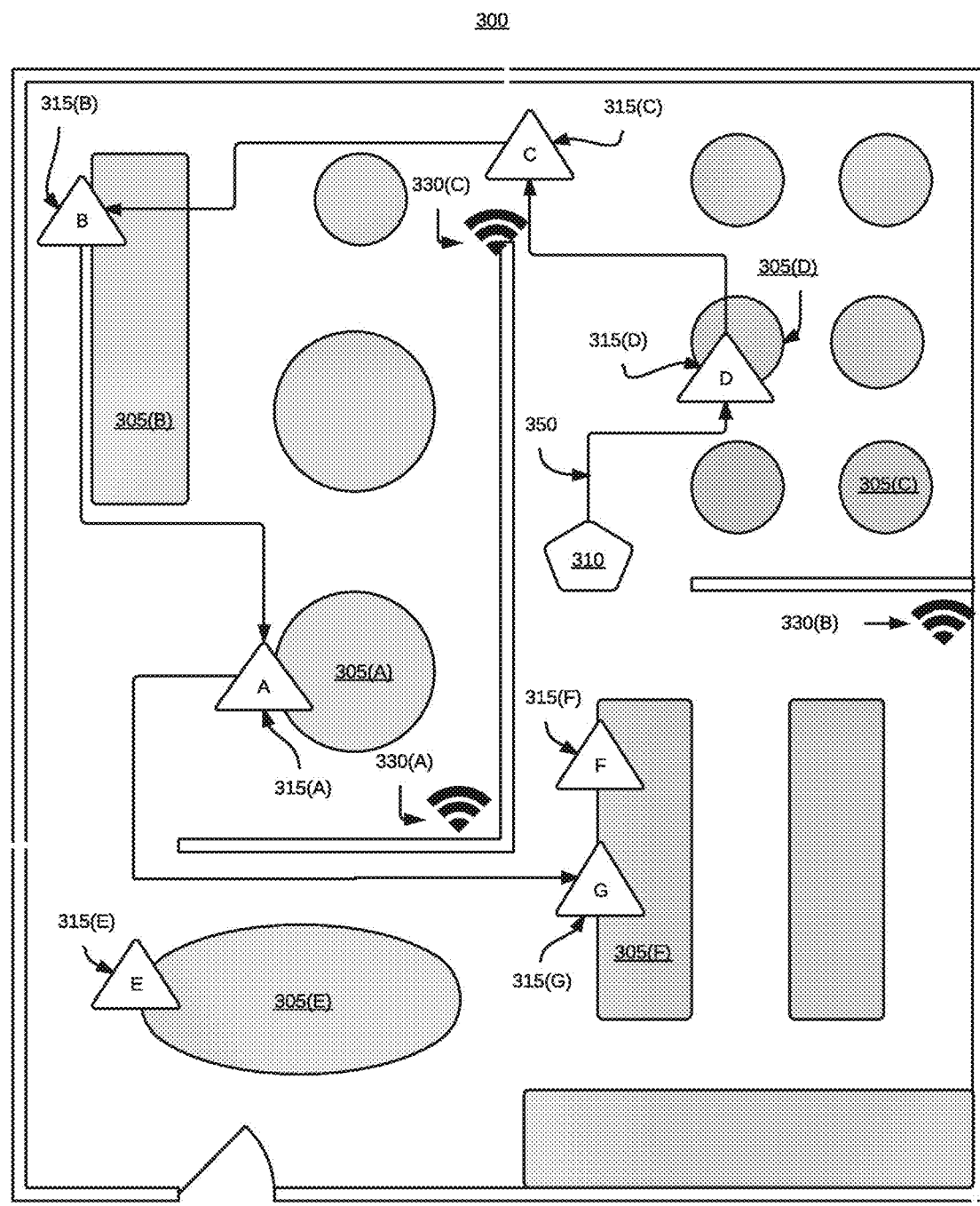

FIGS. 3A-3B illustrate an example use case for item delivery optimization in accordance with method 200. The example use case is illustrated in FIG. 3A with respect to a restaurant floorplan 300 comprising a plurality of tables 305(A)-(F), a waiter 310, a plurality of restaurant patrons 315(A)-(G), a bar 320, and a plurality of wireless beacons 330(A)-(C). Waiter 310 may be notified that items are available for delivery at the bar 320. A route 325 may be identified and displayed on client device 120 carried by waiter 310.

FIG. 3B illustrates an updated route in accordance with stage 240 of method 200. For example, in FIG. 3B, restaurant patron 315(G) has moved before receiving their order from waiter 310. An updated route 350 is identified and provided to waiter 310 such that restaurant patron 315(G) will receive their ordered item at their new location at table 305(F). Similarly, restaurant patron 315(C) is determined to be moving, and the delivery location for the items associated with restaurant patron 315(C) has been updated.

Although the above figure illustrates a restaurant order delivery use case, this should be considered a non-limiting example. Many other uses have been contemplated, such as mail/parcel delivery, personnel location, emergency services aid, logistics tracking, equipment deployments, and others. For example, mail items for delivery to various persons within an office building may be routed and prioritized as described above, with routing instructions taking elevator availability and speeds into account. For the personnel location use case, mobile devices associated with a specified group of individuals could be tracked and a route to locate each and/or some of those individuals could be calculated. This may be particularly useful in a security application (e.g., tracking each member of a delegation or family) and/or in an educational setting (e.g., tracking the location of pre-schoolers and alerting a teacher when one is wandering out of bounds, then displaying a route to the child or helping chaperones locate their students while on a field trip).

In emergency situations, such as a fire, routes to people who may be trapped could be displayed, and/or routes to pre-defined rescue points and special needs people and/or their pets could be calculated. By relying on reports made by mobile devices associated with those who need assistance, emergency workers may receive additional information about the situation surrounding each, and routing priorities may be calculated accordingly. The mobile devices may receive inputs actively from users and/or may use sensors such as microphones and cameras to passively record and report the environment. Such passive recordings may also assist in determining which devices are actually associated with a user in need of assistance and which are simply in the area but not with a person.

Logistics tracking and equipment deployment cases may allow shippers and/or deployment managers to track and verify that multiple components of a shipment or deployment are on schedule, routed and/or deployed to the correct destinations, and properly prioritized. For example, a new wireless network deployment may specify a delivery location for a central Internet router and then a route to each of several repeater locations.

Figure 4:
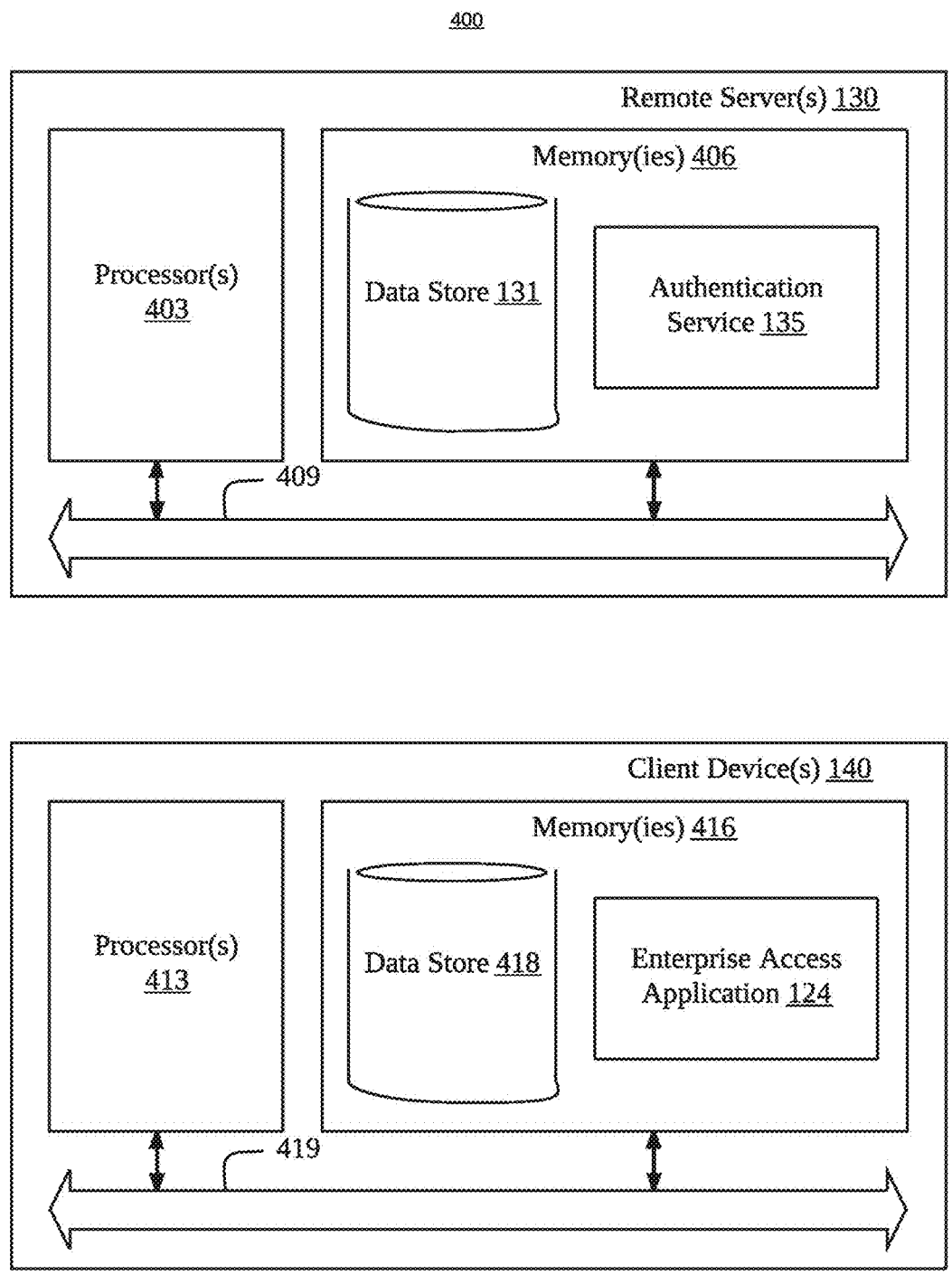
FIG. 4 is a schematic block diagram of a remote server and a client device.

FIG. 4 illustrates schematic block diagram 400 of the remote server 130 and the client device 140 according to embodiments of the present disclosure. The remote server 130 includes at least one processor circuit, for example, having a processor 403 and a memory 406, both of which are coupled to a local interface 409. To this end, the remote server 130 may comprise, for example, at least one server computer and/or like device. Similarly, the client device 140 includes at least one processor circuit, for example, having a processor 413 and a memory 416, both of which are coupled to a local interface 419. Additionally, the client device 120 may be in data communication with a display for rendering user interfaces and at least one other I/O device for inputting and outputting data. To this end, the client device 140 may comprise, for example, at least one mobile wireless device, computer, and/or like device. The local interfaces 409 and 419 may comprise, for example, a data bus with an accompanying address/control bus and/or other bus structure as can be appreciated.

Stored in the memories 406 and 416 are both data and several components that are executable by the processors 403 and 413. In particular, stored in the memory 406/416 and executable by the processors 403 and 413 are a authentication service 135, an enterprise access application 124, and potentially other applications. Also stored in the memories 406 and 416 may be a data stores 131 and 418 and other data. In addition, an operating system may be stored in the memories 406 and 416 and executable by the processors 403 and 413.

It is to be understood that there may be other applications that are stored in the memories 406 and 416 and are executable by the processors 403 and 413 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, and/or other programming languages.

A number of software components are stored in the memories 406 and 416 and are executable by the processors 403 and 413. In this respect, the term "executable" means a program file that is in a form that can ultimately be run by the processors 403 and 413. Examples of executable programs may be, for example, a compiled program that can be translated into machine code in a format that can be loaded into a random access portion of the memories 406 and 416 and run by the processors 403 and 413, source code that may be expressed in proper format such as object code that is capable of being loaded into a random access portion of the memory 406/416 and executed by the processors 403 and 413, and/or source code that may be interpreted by another executable program to generate instructions in a random access portion of the memories 406 and 416 to be executed by the processors 403 and 413, etc. An executable program may be stored in any portion and/or component of the memories 406 and 416 including, for example, random access memory (RAM), read-only memory (ROM), hard drive, solid-state drive, USB flash drive, memory card, optical disc such as compact disc (CD) and/or digital versatile disc (DVD), floppy disk, magnetic tape, and/or other memory components.

The memories 406 and 416 is defined herein as including both volatile and nonvolatile memory and data storage components. Volatile components are those that do not retain data values upon loss of power. Nonvolatile components are those that retain data upon a loss of power. Thus, the memories 406 and 416 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, and/or a combination of any two and/or more of these memory components. In addition, the RAM may comprise, for example, static random access memory (SRAM), dynamic random access memory (DRAM), and/or magnetic random access memory (MRAM) and other such devices. The ROM may comprise, for example, a programmable read-only memory (PROM), an erasable programmable read-only memory (EPROM), an electrically erasable programmable read-only memory (EEPROM), and/or other like memory device.

Also, the processors 403 and 413 may represent multiple processors, and the memories 406 and 416 may represent multiple memories that operate in parallel processing circuits, respectively. In such a case, the local interfaces 409 and 419 may be an appropriate network 109 (FIG. 1) that facilitates communication between any two of the multiple processors 403 and 413, and/or between any two of the memories 406 and 416, etc. The local interfaces 409 and 419 may comprise additional systems designed to coordinate this communication, including, for example, performing load balancing. The processors 403 and 413 may be of electrical and/or of some other available construction.

Although the authentication service 135, the enterprise application service 124, and other various systems described herein may be embodied in software and/or code executed by general purpose hardware as discussed above, as an alternative the same may also be embodied in dedicated hardware and/or a combination of software/general purpose hardware and dedicated hardware. If embodied in dedicated hardware, each can be implemented as a circuit and/or state machine that employs any one of and/or a combination of a number of technologies. These technologies may include, but are not limited to, discrete logic circuits having logic gates for implementing various logic functions upon an application of at least one data signal, application specific integrated circuits having appropriate logic gates, and/or other components, etc.

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of this disclosure may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. The Figures above and their associated descriptions provide a discussion of a variety of operating environments in which embodiments of this disclosure may be practiced. However, the devices and systems illustrated and discussed with respect to the Figures are for purposes of example and illustration and are not limiting of a vast number of computing device configurations that may be utilized for practicing embodiments of this disclosure as described herein.

The term computer readable media as used herein may include computer storage media. Computer storage media may include volatile and nonvolatile, removable and non-removable media implemented in any method or technology for storage of information, such as computer readable instructions, data structures, program modules, or other data. System memory, removable storage, and non-removable storage are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store.

The term computer readable media as used herein may also include communication media. Communication media may be embodied by computer readable instructions, data structures, program modules, non-transitory media, and/or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

A number of applications and data files may be used to perform processes and/or methods as described above. The aforementioned processes are examples, and a processing unit may perform other processes. Other programming modules that may be used in accordance with embodiments of this disclosure may include electronic mail, calendar, and contacts applications, data processing applications, word processing applications, spreadsheet applications, database applications, slide presentation applications, drawing or computer-aided application programs, etc.

Generally, consistent with embodiments of this disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of this disclosure may also be practiced in distributed computing environments where tasks are performed by remote processing devices that are linked through a communications network. In a distributed computing environment, program modules may be located in both local and remote memory storage devices.

Furthermore, embodiments of this disclosure may be practiced in an electrical circuit comprising discrete electronic elements, packaged or integrated electronic chips containing logic gates, a circuit utilizing a microprocessor, or on a single chip containing electronic elements or microprocessors. Embodiments of this disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of this disclosure may, for example, be implemented as a computer process and/or method, a computing system, an apparatus, device, or appliance, and/or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of this disclosure may be practiced via a system-on-a-chip (SOC) where each and/or many of the elements described above may be integrated onto a single integrated circuit. Such an SOC device may include one or more processing units, graphics units, communications units, system virtualization units and various application functionalities, all of which may be integrated (or "burned") onto the chip substrate as a single integrated circuit. When operating via an SOC, the functionality, described herein, with respect to training and/or interacting with any element may operate via application-specific logic integrated with other components of the computing device/system on the single integrated circuit (chip).

Embodiments of this disclosure are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and the property of the Assignee. The Assignee retains and reserves all rights in the code included herein, and grants permission to reproduce the material only in connection with reproduction of the granted patent and for no other purpose.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
identifying, by at least one computing device, a physical access point device along a route to a first device at a first location, the physical access point device being configured to cause a physical lock actuator component of the physical access point device to be in an unlocked state when an access credential from a second device is identified by the physical access point device;
requesting, by the at least one computing device, an authorization credential from the second device;
determining, by the at least one computing device, that the second device complies with a requirement for distribution of the access credential to the second device based on the authorization credential;
and
in response to the second device complying with the requirement for distribution of the access credential, providing, by the at least one computing device, the access credential to the second device.

2. The method of claim 1, wherein:
the first device comprises a recipient device of a recipient of an item for delivery; and
the second device comprises a delivery device of a delivery coordinator assigned to deliver the item.

3. The method of claim 1, wherein providing the access credential an item to the second device comprises providing, by the at least one computing device, the access credential to the second device over a computer network.

4. The method of claim 1, wherein:
the authorization credential comprises a device characteristic of the second device; and
determining that the second device complies with the requirement which comprises determining, by the at least one computing device, that the device characteristic complies with at least one compliance rule for the second device to use the access credential to unlock the physical access point device.

5. The method of claim 4, wherein the at least one compliance rule comprises at least one of a hardware restriction rule, or a software restriction rule, or a device management restriction rule associated with the second device.

6. The method of claim 4, wherein:
the authorization credential comprises a user access credential; and
determining that the second device complies with the requirement comprises determining, by the at least one computing device, that a user access credential is included in a list of user access credentials, the list of user access credentials identifying a list of users approved to unlock the physical access point device.

7. The method of claim 1, wherein the physical access point device comprises at least one access point computing device configured to direct the physical lock actuator component to unlock based on the access credential.

8. The method of claim 1, further comprising:
determining, by the at least one computing device, that the first device has moved to a second location;
updating, by the at least one computing device, the route to a second route to the second location, the second route requiring passage through a second physical access point;
determining, by the at least one computing device, that the second device complies with a second requirement for distribution of a second access credential to the second device based on the authorization credential; and
in response to the second device complying with the second requirement, providing, by the at least one computing device, the second access credential to the second device.

9. A system comprising:
a memory device to store instructions; and
at least one computing device configured, through execution of the instructions stored on the memory device, to at least:
identify a physical access point device along a route to a first device, the physical access point device being configured to cause a physical lock actuator component of the physical access point device to be in an unlocked state when an access credential from a second device is identified by the physical access point device;
request an authorization credential from the second device;
determine that the second device complies with a requirement for distribution of the access credential to the second device based on the authorization credential; and
in response to the second device complying with the requirement for distribution of the access credential, providing the access credential to the second device.

10. The system of claim 9, wherein:
the first device comprises a recipient device of a recipient of an item for delivery; and
the second device comprises a delivery device of a delivery coordinator assigned to deliver the item.

11. The system of claim 9, wherein:
the authorization credential comprises a device characteristic of the second device; and
the at least one computing device is further configured to at least determine that the device characteristic complies with at least one compliance rule for the second device to use the access credential to unlock the physical access point device.

12. The system of claim 11, wherein the at least one compliance rule comprises at least one of a hardware restriction rule, a software restriction rule, or a device management restriction rule associated with the second device.

13. The system of claim 9, wherein:
the first device comprises a recipient device of a recipient of an item for delivery; and
the second device comprises a delivery device of a delivery coordinator assigned to deliver the item.

14. The system of claim 9, wherein the physical access point device comprises at least one access point computing device configured to direct the physical lock actuator component to unlock based on the access credential.

15. The system of claim 9, wherein the at least one computing device is further configured to at least:
determine that the first device moved to a second location;
update the route to a second route to the second location, the second route requiring passage through a second physical access point;
determine that the second device complies with a second requirement for distribution of a second access credential to the second device based on the authorization credential; and
in response to the second device complying with the second requirement, providing the second access credential to the second device.

16. A computer-readable medium which stores a set of instructions that, when executed by at least one computing device, performs a method executed by the set of instructions comprising:
identifying, by the at least one computing device, a physical access point device along a route to a first device, the physical access point device being configured to cause a physical lock actuator component of the physical access point device to be in an unlocked state when an access credential from a second device is identified by the physical access point device;
requesting, by the at least one computing device, an authorization credential from the second device;
determining, by the at least one computing device, that the second device complies with a requirement for distribution of the access credential to the second device based on the authorization credential;
in response to the second device complying with the requirement for distribution of the access credential, providing, by the at least one computing device, the access credential to the second device.

17. The computer-readable medium of claim 16, wherein:
the authorization credential comprises a device characteristic of the second device; and
determining that the second device complies with the requirement comprises determining, by the at least one computing device, that the device characteristic complies with at least one compliance rule for the second device to use the access credential to pass through the physical access point device.

18. The computer-readable medium of claim 17, wherein the at least one compliance rule comprises at least one of a hardware restriction rule, a software restriction rule, or a device management restriction rule associated with the second device.

19. The computer-readable medium of claim 16, wherein:
the authorization credential comprises a user access credential; and determining that the second device complies with the requirement comprises determining, by the at least one computing device, that a user access credential is included in a list of user access credentials, the list of user access credentials identifying a list of users approved to unlock the physical access point device.

20. The computer-readable medium of claim 16, wherein the physical access point device comprises at least one access point computing device configured to direct the physical lock actuator component to unlock based on the access credential.

\* \* \* \* \*